United States Patent
Peltonen et al.

(10) Patent No.: US 6,780,903 B2
(45) Date of Patent: Aug. 24, 2004

(54) PROCESS FOR THE PREPARATION OF POLYMER DISPERSIONS

(75) Inventors: Soili Peltonen, Rajamäki (FI); Maija Elina Heikkilä, Vantaa (FI); Hannu Mikkonen, Rajamäki (FI); Jouni Hamara, Kerava (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 1 day.

(21) Appl. No.: 09/846,202

(22) Filed: May 2, 2001

(65) Prior Publication Data

US 2001/0021733 A1 Sep. 13, 2001

Related U.S. Application Data

(63) Continuation of application No. 09/331,971, filed as application No. PCT/FI97/00837 on Dec. 31, 1997.

(30) Foreign Application Priority Data

Dec. 31, 1996 (FI) .................................................. 965305

(51) Int. Cl.$^7$ .............................. C08J 5/10; C08L 3/00; C08L 89/00
(52) U.S. Cl. .......................... 524/47; 524/48; 524/317; 524/313; 524/503; 524/297; 524/310
(58) Field of Search .............................. 524/47, 48, 35, 524/275, 277, 317, 318, 319, 320, 321, 322, 297, 503, 310, 313

(56) References Cited

U.S. PATENT DOCUMENTS

| | | |
|---|---|---|
| 4,040,862 A | 8/1977 | Voigt et al. |
| 4,079,025 A | 3/1978 | Young et al. |
| 4,385,078 A | 5/1983 | Onda et al. |
| 4,517,324 A | 5/1985 | Luhmann et al. |
| 5,993,530 A | 11/1999 | Tanaka et al. |

FOREIGN PATENT DOCUMENTS

| | | |
|---|---|---|
| EP | 97/10292 A1 | 3/1997 |
| EP | 0850988 A1 | 1/1998 |
| FI | 74479 | 10/1987 |
| WO | WO9113207 | 9/1991 |
| WO | WO9311300 | 6/1993 |
| WO | WO9600263 | 1/1996 |
| WO | WO9749762 | 12/1997 |

OTHER PUBLICATIONS

Wolff, I.A., Olds, D.W. and Hilbert, G.E., The Acylation of Corn Starch, Amylose and Amylpectin, J. Amer. Chem. Soc. 73 (1952) pp. 346–349.

Gros, A.T. and Feuge, R.O., Properties of the Fatty Acid Esters of Amylose, J. Amer. Oil Chemists' Soc 39 (1962) pp. 19–24.

Primary Examiner—Samuel A. Acquah
Assistant Examiner—U. K Rajguru
(74) Attorney, Agent, or Firm—Birch, Stewart, Kolasch & Birch, LLP

(57) ABSTRACT

The invention relates to a new process for preparing polymer dispersions. According to the invention, a mixture is first formed of a polymer component, a plasticizer, dispersion auxiliaries and water, the mixture is then heated to approximately 20 to 100° C. in order to form a paste-like composition, and the paste-like composition is dispersed in water. The dispersion obtained according to the invention can be used for coating paper or board, as a primer, as a component in adhesives, paint or lacquer, and it is also suited for the manufacture of cast films and for use as a binder in materials based on cellulosic fibers.

34 Claims, No Drawings

PROCESS FOR THE PREPARATION OF POLYMER DISPERSIONS

This application is a continuation of co-pending application Ser. No. 09/331,971, filed on Aug. 20, 1999 and for which priority is claimed under 35 U.S.C. §120. Application Ser. No. 09/331,971 is the national phase of PCT International Application No. PCT/FI97/00837 filed on Dec. 31, 1997 under 35 U.S.C. §371. The entire contents of each of the above-identified applications are hereby incorporated by reference. This application also claims priority of Application No. 965305 filed in Finland on Dec. 31, 1996 under 35 U.S.C. §119.

The present invention relates to dispersions of biodegradable polymers. The invention particularly concerns a process for the preparation of a hydrophobic polymer dispersion characterized by a) forming a mixture of a biopolymer, a plasticizer, dispersion auxiliaries and water, b) heating up the mixture in order to obtain a paste-like composition, and c) diluting the paste-like composition in water.

The current emphasis on an environmentally friendly attitude and green values is opening up new markets for products based on renewable natural resources. Such trends can be observed within the sectors of, e.g. the packaging industry, the sanitary industry and the glue industry, where recyclability, reuse, compostability, biodegradability and lack of environmental strain are demands of today. The trend of replacing products based on petrochemistry by processed biopolymer products is also emphasized. Starch and its derivatives constitute a particularly interesting initial material for the production of biodegradable polymer products. Other important biodegradable or compostable polymers include, among others, polycaprolactone, polylactide and other lactic acid based polymers and copolymers, such as polyester urethanes.

Polymer dispersions are used, e.g., in the coating of paper and board in order to improve their water resistance. Dispersions used in the paper industry today contain, in addition to fillers, various synthetic latexes which are quite poorly degraded in a biological environment.

Solutions are previously known where modified starch components have been used for the preparation of paper coating dispersions. Thus, a hydrophobic coating composition is known from WO Published Application No. 93/11300 which is based on a polymer dispersion containing a starch derivative having a polymer containing styrene and butadiene monomers grafted thereto. Thus, this solution does not use any of the biodegradable components which would be compatible with the demands for recyclability made on the products.

The present invention aims at achieving a hydrophobic dispersion whereby at least most and preferably essentially all of its components are biodegradable. The invention especially aims at providing a dispersion whose polymer component mainly comprises a biodegradable polymer (below also termed "biopolymer"), advantageously starch or a derivative thereof and/or lactic acid based polymers and copolymers. The invention further aims at providing a process for the preparation of hydrophobic dispersions.

The invention is based on the surprising observation that stable dispersions can be prepared from many biodegradable polymers by forming a paste-like composition of the polymer in question, a plasticizer, dispersion auxiliaries and water, which composition is dispersed in water. No solvents are then required for preparing the dispersion. Thus, according to the present process the polymer used is a biodegradable polymer which is admixed with a plasticizer, auxiliaries and water in order to form a premixture, the premixture is heated in order to provide a paste-like composition, and the paste-like composition is diluted/dispersed in water.

In more detail, the method according to the invention is characterized by a process for the preparation of a hydrophobic polymer dispersion, characterized by a) forming a mixture of a biopolymer, a plasticizer, dispersion auxiliaries and water, b) heating up the mixture in order to obtain a paste-like composition, and c) diluting the paste-like composition in water.

The invention offers considerable benefits. Thus, the raw materials of the polymer dispersion according to the present invention are mainly based on renewable natural resources and are biodegradable/compostable. The method is particularly well suited for finely divided/powdery polymers. The starch component may be derived from any native starch; it need not be, e.g., a starch rich in amylose. No solvents requiring removal by evaporation need be used for formulating the dispersion, instead, the dispersing may be performed in a conventional disperser or even a mixer. There is no need to dry the polymer prior to dispersing.

Films made from the dispersion are quite resistant to water and can be exploited to greatly improve the water resistance of paper or board. The dispersions also have good adherence properties. Thus, the novel polymer dispersions can be used for coating paper or board, as primers, as adhesive component in water-soluble adhesives (e.g. labelling adhesives) or as a component in paint or lacquer. The examples 10 and 11 deal with the use of the dispersions for improving the water resistance of paper coating latexes. As will emerge from the examples the dispersions can be used for partly or entirely replacing synthetic binders (e.g. 10 to 90% of a synthetic binder, 90 to 10% of the present dispersion).

The suitability of the dispersions for use as lamination adhesives is examined in Example 5 and it will emerge that a plastic film laminated onto paperboard using the dispersion could not possibly be detached without breaking the board surface. Example 7, then, assesses the drying properties of the dispersions when used as paint vehicle, and it is found that films made from the dispersions are plastic-like and dry quickly. Therefore, the dispersions are excellently suited for use as paint vehicles. It has also been found that the dispersions can be used as lacquers for the surface treatment of wood and other materials. They are also suitable in the production of hydrophobic cast films and as binders in materials based on cellulose fibres. The water resistance of the dispersions can be further improved by modifying them using cross-linking chemicals. If desired, these can be combined with the use of wax.

In the following the present invention is examined in greater detail by means of a detailed description and a number of working examples.

According to the invention, dispersions of biodegradable polymers are advantageously prepared in three steps whereafter the dispersions can be treated further using modifying chemicals in order to achieve e.g. improved water resistance. If required, the dispersions can also be homogenized.

First, a mixture is formed of the biopolymer, dispersion auxiliaries (including protective colloids, if any) and water. Depending on the biopolymer, the mixture may also contain, for example, a polymer plasticizer and other adjuvants and auxiliaries. The mixture contains a part of the total amount of water in the dispersion. Advantageously, 10 to 90%, preferably about 20 to 80%, of the total amount of water in the final dispersion is contained in the mixture, whereby the premixture contains advantageously 1 to 200 parts by weight, preferably about 50 to 150 parts by weight of water, to 100 parts by weight of the polymer. The aim is to provide a sufficiently stable and viscous mixture. The mixture is stirred to provide a homogeneous mass by applying intensive stirring.

The dispersion auxiliaries are most advantageously dissolved or mixed into the water to be added into the premixture before being intermixed with the polymer.

During the second step of the process the mixture is heated to about 20 to 100° C., preferably about 40 to 60° C. The temperature varies according to the polymer used and the composition of the dispersion. Stirring is continued at the temperature in question until a suitably paste-like mixture results. In the case of certain polymers no actual heating step is required and the paste-like mixture is instead obtained by continuing the stirring at room temperature.

The stirring times are usually equally divided between the formation of the mixture and the heating step. Depending on the amounts of the materials, the mixture is stirred for about 1 min to 24 h, advantageously about 10 min to 2 h, during the first step of the process, and for about 1 min to 24 h, advantageously about 10 min to 2 h, during the second step of the process. The total stirring time is typically between about 5 min and 4 h.

During a third step of the process the rest of the calculated amount of water in the dispersion is added to the paste-like mixture. The addition is advantageously performed gradually and under simultaneous intensive stirring of the dispersion. According to a preferred embodiment of the invention water is added to the paste at an elevated temperature (>20° C.), whereby it has been found of particular advantage to add the water to hot paste while simultaneously allowing the paste to cool. However, it is also possible to dilute the paste in water at room temperature or even at lower temperatures. Water is most advantageously added at such a rate that the plasticized mass remains homogeneous and no separation of phases occurs. During the addition, the vaporizing water is condensed and recycled to the mixture.

Even though the above describes how a dispersion is formed in water, even different kinds of solvents can be used as the dispersion medium.

According to a particularly preferred embodiment the dispersion is prepared such that 100 parts by weight of a starch ester, 5 to 50 parts by weight of a protective colloid and 10 to 200 parts by weight of a plasticizer are admixed with 70 to 120 parts by weight of water containing 0.1 to 10 parts by weight of a surface-active agent in order to provide a starch ester blend, after initial stirring, the temperature of the blend is raised to 40 to 90° C. and the stirring is continued until a white paste-like composition is obtained, and 50 to 150 parts by weight of water are added to said composition whilst allowing the temperature to decline to room temperature.

After dispersing the dispersion is, if desired, homogenized in a manner known as such in order to stabilize it. The homogenization may be achieved e.g. by means of a pressure homogenizer. The homogenization may be applied to reduce particle size by 50 to 100%, thereby further improving the stability of the dispersion. Dispersions according to the invention will remain stable for several weeks, even months.

As stated above, the water resistance of the dispersions may be further improved by means of cross-linking chemicals. These include, among others, glycosal and aluminium and zirconium salts. Of aluminium salts, aluminium acetyl acetonate, in particular, may be mentioned. The cross-linking chemicals are normally used in an amount of about 0.01 to 30%, advantageously about 0.1 to 10%, and preferably about 0.5 to 8%, of the weight of the dispersion.

The effect of cross-linking chemicals on the water resistance of the dispersions and, correspondingly, on the water resistance of board coated with the dispersion, is examined in Examples 6 and 8.

Hydrophobic starch dispersions may be prepared in the above-described manner containing as their starch component a starch ester, starch ether, mixed ester/ether of starch or grafted starch made from native starch, hydrolyzed starch, oxidized starch, cross-linked starch or gelatinized starch. Hydrophobic polymer dispersions may also be prepared from other biodegradable polymers, such as polycaprolactone, lactic acid polymers, lactic acid-based polyester urethanes, polylactide, cellulose acetate and/or polyhydroxy butyrate/valerate. The last-mentioned polymers may of course be used in mixtures with the starch polymers. It is particularly advantageous to provide hydrophobic polymer dispersions containing starch ester and hydroxy alkyl starch ester. The process is especially well suited for powdery base materials.

In the composition according to the invention starch or a derivative thereof, in the following also termed starch component, may be based on any native starch having an amylose content of 0 to 100% and an amylopectin content of 100 to 0%. Thus the starch component may be derived from barley, potato, wheat, oats, peas, corn, tapioca, sago, rice or any similar tuber-bearing or grain plant. It can also be based on starches prepared from said native starches by oxidizing, hydrolyzing, cross-linking, cationizing, grafting, or by etherification or esterification.

It has been found advantageous to use a starch-based component derived from an ester formed by starch and one or more aliphatic $C_{2-24}$ carboxyl acids. The carboxyl acid component of such an ester may then be derived from a lower alkane acid such as acetic acid, propionic acid or butyric acid or a mixture thereof The carboxyl acid component may, however, also be derived from a saturated or an unsaturated natural fatty acid. Examples of these include palmitinic acid, stearic acid, oleic acid, linoleic acid and mixtures thereof. The ester may also be composed of both long- and short-chain carboxyl acid components. As an example, a mixed ester of acetate and stearate may be mentioned. In addition to acids, the corresponding acid anhydrides and acid chlorides and other corresponding reactive acid derivatives may also be used in a manner known as such for forming the ester.

The preparation of the fatty acid esters of starch is performed, for instance, in the manner described in the following publications relevant in the field: Wolff, I. A., Olds, D. W. and Hilbert, G. E., The Acylation of Corn Starch, Amylose and Amylopectin, J. Amer. Chem. Soc. 73 (1952) 346–349, or Gros, A. T. and Feuge, R. O., Properties of Fatty Acid Esters of Amylose, J. Amer. Oil Chemists' Soc 39 (1962) 19–24.

Starch acetates may be prepared by allowing the starch to react with acetanhydride in the presence of a catalyst. As the catalyst, for example a 50% sodium hydroxide is used. Even other known methods described in the literature for preparing acetates are suited for the preparation of a starch acetate. By varying the amount of acetic acid anhydride, the amount of the base used as the catalyst, and the reaction time, starch acetates having different degrees of substitution can be prepared.

According to a preferred embodiment the starch component is an esterified starch, advantageously a starch acetate having a degree of substitution between 0.5 and 3, advantageously between 1.5 and 3 and preferably between 2 and 3. It is particularly preferred to use, e.g., enzymatically hydrolyzed barley starch for the preparation of the starch esters.

According to another preferred embodiment the starch component comprises hydroxyalkylated starch or an ester thereof. Hereby it is particularly preferred to use hydroxy propyl starch having a molar degree of substitution of 1.4 at the most, advantageously 1 at the most, and hydroxy propyl starch esters having a molar degree of substitution of 1.4 at the most, advantageously 1 at the most and preferably 0.1 to 0.8, and the degree of substitution is at least 2, advantageously 2.5 to 3.

When the dispersions are prepared from starch or derivatives thereof the dispersion composition is advantageously also made to contain a plasticizer which is advantageously present in an amount of 0.01 to 95% by weight, preferably about 1 to 50% by weight of a plasticizer. Any known plasticizers can be used, examples thereof including the following: triacetin, diacetin, monoacetin, triethyl citrate, tributyl citrate, acetyl triethyl citrate, acetyl tributyl citrate, dimethyl succinate, diethyl succinate, oligoesters of amber acid and diols, ethyl lactate, methyl lactate, fatty acid esters of glycerol, castor oil, olive oil, rapeseed oil, tall oil, dibutyl phthalate, diethyl phthalate, and mixtures thereof.

The starch dispersion further contains a dispersion auxiliary by means of which the biopolymer can be dispersed in water in sufficiently finely divided particles in order to form a stable dispersion. The dispersion auxiliaries comprise surface-active agents and protective colloids. Examples of the surface-active agents include cationic, anionic and non-ionic tensides, such as polyoxyethylene derivatives (polysorbates, polyoxyethylene alcohols), saponin, alkyl sulphonates, alkyl benzene sulphonates, fatty acid soap; lignosulphonates, sarcosinates, fatty acid amines and amides, phospholipids, sugar lipids, lecithin and/or wood extracts. The surface-active agents are usually present in an amount of about 0.1 to 20%, preferably about 0.5 to 15%, of the weight of the biopolymer.

Suitable protective colloids include polyvinyl alcohol (PVA), particularly PVA having a weight-average molar mass of about 10.000 to 115.000, and cationic starch and hydroxy alkyl starch as well as hydroxy alkyl cellulose, which may be used separately or together with PVA. The dispersions may further contain alkyl ethene dimer wax (AKD), beeswax or carnauba wax as adjuvants or auxiliaries. These are typically present in an amount of about 1 to 80%, preferably about 5 to 60%, of the weight of the polymer.

To cite an example of advantageous polymer dispersion compositions, a composition may be mentioned containing 5 to 25 parts by weight of a starch ester, 5 to 50 parts by weight of a plasticizer, 1 to 150 parts by weight of water and 1 to 20 parts by weight of a dispersion auxiliary.

Water is typically present in an amount which is approximately 2– . . . 10, and advantageously about 4– . . . 6 times the amount of the biodegradable polymer, plasticizer in an amount which is about 0.1– . . . 2 times and auxiliary in an amount which is about 0.1–1.5 times the amount of the biodegradable polymer. Thus, by way of exemplifying the preparation of a hydrophobic starch ester dispersion, about 1.0 to 5 kg of starch ester, 0.5 to 6 kg of plasticizer and about 0.1 to 1.5 kg of auxiliary may be dispersed in 10 kg of water.

Depending on the intended use, such a polymer dispersion may further be made to contain 0.01 to 30% by weight, preferably about 5 to 30% by weight of a cellulose ester, such as cellulose acetate, cellulose propionate or cellulose butyrate, or mixed esters thereof.

The dispersions may further contain adjuvants and/or auxiliaries known within the plastics technology as such. Tall resins and derivatives thereof may be used to improve the adhesion properties of the dispersions. Because tall resins contain double bonds they also serve to improve the drying properties of the dispersions. Tall resins are typically present in an amount of 1 to 50%, advantageously about 5 to 30%, of the weight of the biopolymer. In paint applications the dispersions may contain 0.1 to 80% of alkyd compounds (binders commonly used in paints and printing inks) of the amount of starch or a corresponding biopolymer. These are typically condensate products formed of a bivalent acid, polyol (glycerol or pentathritol) and a fatty acid and natural oil. For example, the fatty acid ester of pentaerythritol may be cited which is also used in Example 1 (Table 1, test 13).

The invention provides dispersions of biodegradable polymers, in particular starch derivatives, preferably starch esters, wherein 90% of the polymer particles are smaller than 10 $\mu$m. By homogenization dispersions are obtained having particle sizes which on the average are below 2 $\mu$m or even below 1 $\mu$m. Depending on the intended use, dispersions may further be prepared having a multimodal, in practice mostly a bimodal particle size distribution.

The following non-limiting examples are provided by way of illustrating the invention. The substitution degrees of the starch acetates cited in the examples are determined in accordance with Wurzburg (Wurzburg, O. B, Acetylation, in: Methods in Carbohydrate Chemistry, Vol. IV, ed. R. L. Whistler, Academic Press, New York and London, 1964, p. 288). The molar masses, then, have been determined on the basis of GPC analysis in the Alcohol Inspection Laboratory. The equipment used was HP-1090, two in a column series (Waters, Ultra Hydrogel 2000), solvent 50 nM NaOH, temperature 40° C., dextran standards, as detectors RI and viscosity detectors. The molar mass has been determined from the starch used as the starting material.

EXAMPLE 1

Preparation of a Dispersion

The dispersion formulations of Table 1 were prepared in the following manner: the starch ester or modified starch ester, polyvinyl alcohol, part of the water (water:starch ester 0.7–1.2) containing a surface-active agent as admixture, and the plasticizers as well as other base materials are intermixed in optional order. The obtained mixture is worked into a smooth mass. The stirring is continued at room temperature until a white paste begins to form. The temperature is raised depending on the formulation to 20–100° C. and the stirring is continued for ½ h. The heating is discontinued and the rest of the water is added while stirring intensively and the temperature of the dispersion is allowed to decline to 20° C. The dispersion is stirred for about 15 min after admixing all of the water.

The dispersions were stable and no phase separation was observed during a period of one month.

EXAMPLE 2

Preparation of a Dispersion from an Undried Starch Ester 11.98 kg of undried hydroxy propyl starch acetate (dry matter content 39.7%), 56.1 g of a Tween-21-emulgator, 0.747 kg of Mowiol 10-74 and 5.6 kg of triacetin were intermixed. The mixture was heated to 80 to 85° C. until a paste-like dispersion began to form. The mixture was stirred for about 1 h. The heating was discontinued and 1.5 l of water was added. A stable dispersion resulted, which shows that the starch ester need not be dried but the dispersing may be performed as a follow-up process.

EXAMPLE 3

Preparation of a Dispersion from Cellulose Acetate 50 g of cellulose acetate (C3PML, Courtaulds Chemicals), 50 g of water with 1 g of emulgator (Essai 2980 BA, Seppic Inc.) dissolved therein, 60 g of plasticizer (e.g., triacetin) and 9 g of polyvinyl alcohol (Mowiol 10-74, Hoechst Ag) were dispersed as explained in Example 1. The paste-like dispersion was diluted with 60 g of water under cooling. The dispersion remained stable for more than two weeks.

EXAMPLE 4

Preparation of a Dispersion from Polyester Urethane

A dispersion was prepared in accordance with Example 1. The amounts used during the first step of the dispersion were 20 g of polyester urethane (Mn $10^5$), 40 g of a poly-lactic acid oligomer (Mn $10^4$), 20 g of a plasticizer (e.g. triacetin or triethyl citrate, or an alkyd-based plasticizer, cf. Example 1), 50 g of water having 1 g of emulgator (Essai 2980 BA, Seppic Inc.) and 9 g (Mowiol 10-74, Hoechst Ag) admixed therein. 60 g of dilution water was used and it was added under cooling. The dispersion remained stable for over a month.

EXAMPLE 5

Usability of the Dispersions as Lamination Adhesives

Board was rod coated with the dispersion and dried at 100° C. for 1 h. Strips (2,5×10 cm) were cut of the plastic film and laminated onto the board surface using a hot (140° C.) iron weighing approximately 1 kg. Silicone paper was used between the iron and the board to prevent the plastic film from adhering onto the board surface. The laminating duration was 1 min. Then the test samples were subjected to 20 min of cooling prior to testing. The blank test was carried out by laminating the plastic film directly onto board without any dispersion coating. The cooled laminates were pulled off the board surface. The film laminated with no dispersion was easily detached without damage to the film. The board surface was not broken either.

Of the dispersions described in Example 1, the products according to the tests 3, 7 and 8 were tested, as well as the dispersion of Example 2. These could impossibly be pulled off the board surface without breaking the film, nor did the film come off entirely when subjected to scratching by means of a sharp knife. No essential differences between the dispersions could be found.

EXAMPLE 6

Water Resistance of Dispersions

Amounts indicated in the table of a water solution of glyoxal (40%) and/or Additol VXW 4940 (Vianova Resins

TABLE 1

| BASE MATERIALS | TEST 1 | TEST 2 | TEST 3 | TEST 4 | TEST 5 | TEST 6 | TEST 7 | TEST 8 | TEST 9 | TEST 10 | TEST 11 | TEST 12 | TEST 13 |
|---|---|---|---|---|---|---|---|---|---|---|---|---|---|
| Starch acetate[l] | 50.0 g | | | | | | | | | | | | |
| Hydroxy propyl starch acetate[b] | | 100 g | | | | | 5.0 kg | | | 50 g | | 50 g | 50 g |
| Hydroxy propyl starch acetate[c] | | | 5.0 kg | | | | | | | | | | |
| Starch acetate, HPS acetate 50:50[d] | | | | 5.0 kg | 5.0 kg | 4 0 kg | | 5 g | 50 g | | 50 g | | |
| Polyester urethane[l] | | | | | | | 1.0 kg | 20 g | | | | | |
| Poly-lactic acid oligomer[e] | | | | | | | | 40 g | 25 g | | | | |
| Mowiol 10-74[f] | 5 g | 18 g | 0.7 kg | 0.9 kg | 0.7 kg | 0.9 kg | 1.2 kg | 9 g | 9 g | | 1.0 g | 9 g | 9 g |
| Mowiol 88-8[f] | | | | | | | | | | 16 g | | 10 g | |
| Hydroxy propyl starch[h] | | | | | | | | | | | 12 g | | |
| Essai 2980 BA[h] | | | | 0.1 kg | 0.06 kg | 0.06 kg | | 1 g | 1 g | | | | 2 g |
| Tween-21[l] | 1.2 g | 2 g | 0 06 kg | | | | | | | | | | |
| Tween-81[l] | | | | | | | | | | 0.5 g | | | |
| Lipotin-A[j] | | | | | | | 0.2 kg | | | | | | |
| Triacelin[k] | 50 g | 120 g | 4.0 kg | 5.0 kg | 2.0 kg | 5.0 kg | 5.0 kg | | 40 g | 50 g | 50 g | 50 g | 80 g |
| Citroflex A2[l] | | | | | 2.0 kg | | | 5 g | | | | | |
| Finnresin TIA-8700[a] | | | 2.5 kg | 2.5 kg | 2.5 kg | 2.5 kg | | | | | | | |
| TTE-00[m] | | | | | | | | 20 g | 25 g | | | 11.5 g | |
| Tall resin[n] | | | | | | | | | | | | | 10 g |
| Aluminium acetyl acetate | | | | | | | | | | | | 2.0 g | |
| Water | 100 g | 220 g | 10 kg | 14 kg | 11 kg | 11 kg | 9.5 kg | 120 g | 140 g | 140 g | 150 g | 140 g | 160 g |

[a]) COHPOL EP C6LL100,
[b]) COHPOL EP CSLL100
[c]) COHPOL EP C6M100,
[d]) COHPOL EP C6M100.COHPOL EP C6LL100 1:1, (a–d, g, Primalco Ltd)
[e]) Product inconfonnity wtth Patent Appl. WO 96/01863,
[f]) Hoechst Ag.
[g]) COHPOL EP LL100,
[h]) Seppic Inc,
[i]) ICI PLC,
[j]) Lucas Meyer GmhH & Co.
[k]) Pracetin 1581, Unichema Int
[l]) Morflex, Inc.
[m]) McWhortern) OULU331GP, Forchem Ltd Ag) were admixed into a prepared dispersion. Board was coated with the dispersion and dried at 100° C. for 1 h. The water resistance of the coated board was measured according to the $Cobb_{60}$ test. The results are shown in Table 2 below.

TABLE 2

| Dispersion | Glyoxal (40%) | Additol VXW 4940 | $Cobb_{60}$ |
|---|---|---|---|
| Uncoated board | | | 27.5 |
| Dispersion/Example 1, Test 1 | — | | 10 |
| Dispersion/Example 1, Test 2 | — | | 17.4 |
| Ex.1, Test 1: 35 g | 1.5 ml | | 5 |
| Ex.1, Test 7: 35 g | 2.0 ml | | 8 |
| Ex.1, Test 7: 35 g | 5.0 ml | | 4 |
| Ex.1, Test 6: 3000 g | 125 g | 25 g | 9 |
| Ex.1, Test 8: 35 g | 2.0 ml | 0.4 g | 5 |
| Ex.1, Test 9: 35 g | 2.0 ml | 0.4 g | 6 |
| Ex.1, Test 4: 35 g | 2.0 ml | 0.4 g | 3 |

The results show that the water resistance of board can be improved by dispersion coating and that cross-linking and drying chemicals can be used to further improve the properties.

EXAMPLE 7

Assessment of the Drying Properties of the Dispersions in Paint Vehicle use

The dispersions were applied onto stroke test paper used in the paint industry by means of an application device which meters a certain thickness (150 μm) whereby part of the paper surface was black in order to improve the verifiability of observations. Drying agents commonly used in the paint industry were added to the dispersions (e.g. 0.4 g Additol VXW 4940, Vianova Resins Ag, was added to 35 g of dispersion). The films were dried at 20° C. for 7 days. The water resistance of the dried films was measured by placing a damp towel on the film for half an hour. The towel was removed after half an hour and the film was wiped dry. The appearance of the film was examined after wiping. The abrasion resistance of the film was examined by rubbing the film with a rough paper towel 10 times back and forth while pressing intensely. The results summarized in Table 3 were obtained with the dispersions of Example 1.

TABLE 3

| Dispersion | Appearance of film after water test / Abrasion resistance of film |
|---|---|
| Example 1, Test 1 | Film not clear, partly dissolved Withstands some abrasion |
| Example 1, Test 3 | Film clear, not dissolved Remains intact during abrasion |
| Example 1, Test 4 | Film clear, not dissolved Remains intact during abrasion |
| Example 1, Test 5 | Film clear, not dissolved Remains intact during abrasion |
| Example 1, Test 6 | Film clear, not dissolved Remains intact during abrasion |

Secondly, film formation on a glass plate was examined. Drying agent (Additol VXW 4940) was added to the dispersions, the mixing ratio being as above, and the application of the film was performed in a corresponding manner. The films were dried at 50° C. for 24 hours. Smooth, clear, unfractured films were obtained with all dispersions, and no sign of phase separation could be observed. The films of tests 1, 2, 7 and 10 of Example 1 were slightly adhesive after drying. Films made from the other dispersions were plastic and dried rapidly.

EXAMPLE 8

The Effect of Cross-Linking Chemicals on the Water Resistance of Dispersion-Coated Board Dispersions were prepared according to Table 4 by adding the cross-linking chemicals into a starch acetate based dispersion. Board was rod coated with the dispersion and dried in a heating chamber at 100° C. for 1 h. $Cobb_{60}$ values were measured for the films after 24 hours. The results are summarized in Table 5 below.

TABLE 4

| | | CROSS-LINKING CHEMICALS | | | | | | | |
|---|---|---|---|---|---|---|---|---|---|
| CODE | DISPERSION | CYMEL 303 | CYMEL 327 | CYMEL 1156 | CYMEL 327 | DYNOMIN MM-75-E | DYNOMIN UM15 | GLYOXAL TRIMER | AL-ACAC |
| 1 | 50 g | 0.5 g | | | | | | | |
| 2 | 50 g | 1.0 g | | | | | | | |
| 3 | 50 g | 2.5 g | | | | | | | |
| 4 | 50 g | | 0.5 g | | | | | | |
| 5 | 50 g | | 1.0 g | | | | | | |
| 6 | 50 g | | 2.5 g | | | | | | |
| 7 | 50 g | | | 0.5 g | | | | | |
| 8 | 50 g | | | 1.0 g | | | | | |
| 9 | 50 g | | | 2.5 g | | | | | |
| 10 | 50 g | | | | 0.5 g | | | | |
| 11 | 50 g | | | | 1.0 g | | | | |
| 12 | 50 g | | | | 2.5 g | | | | |
| 13 | 50 g | | | | 5.0 g | | | | |
| 14 | 50 g | | | | | 0.5 g | | | |
| 15 | 50 g | | | | | 1.0 g | | | |
| 16 | 50 g | | | | | 2.5 g | | | |
| 17 | 50 g | | | | | | 0.5 g | | |
| 18 | 50 g | | | | | | 1.0 g | | |
| 19 | 50 g | | | | | | 2.5 g | | |
| 20 | 50 g | | | | | | 5.0 g | | |
| 21 | 50 g | | | | | | | 0.5 g | |
| 22 | 50 g | | | | | | | 1.0 g | |
| 23 | 50 g | | | | | | | 2.5 g | |

TABLE 4-continued

| CODE | DISPERSION | CYMEL 303 | CYMEL 327 | CYMEL 1156 | CYMEL 327 | DYNOMIN MM-75-E | DYNOMIN UM15 | GLYOXAL TRIMER | AL-ACAC |
|---|---|---|---|---|---|---|---|---|---|
| | | | | CROSS-LINKING CHEMICALS | | | | | |
| 24 | 50 g | | | | | | | | 0.5 g |
| 25 | 50 g | | | | | | | | 1.0 g |
| 26 | 50 g | | | | | | | | 2.5 g |
| 27 | 50 g | | | | | | | | |

TABLE 5

| Test | Coat weight, g/m² | $Cobb_{60}$ |
|---|---|---|
| Board | — | 27.5 |
| Dispersion without crossl. | 9.0 | 26.0 |
| 1 | 4.7 | 25.8 |
| 2 | 4.6 | 24.2 |
| 3 | 6.4 | 23.2 |
| 4 | 3.7 | 20.1 |
| 5 | 3.7 | 17.3 |
| 6 | 5.5 | 15.2 |
| 7 | 2.8 | 22.7 |
| 8 | 3.9 | 22.0 |
| 9 | 4.4 | 24.2 |
| 10 | 3.8 | 14.7 |
| 11 | 3.5 | 11.4 |
| 12 | 7.8 | 9.0 |
| 13 | 7.9 | 10.9 |
| 14 | 3.0 | 21.7 |
| 15 | 4.1 | 19.4 |
| 16 | 4.8 | 13.3 |
| 17 | 4.8 | 19.8 |
| 18 | 6.2 | 18.6 |
| 19 | 7.1 | 14.4 |
| 20 | 9.0 | 12.4 |
| 21 | 2.2 | 13.0 |
| 22 | 2.8 | 9.2 |
| 23 | 3.9 | 4.4 |
| 24 | 6.4 | 5.9 |
| 25 | 6.6 | 4.6 |
| 26 | 7.7 | 4.0 |
| 27 | 10.2 | 4.9 |

It will emerge from Table 5 that water resistance is improved by each of the cross-linking chemicals. Glyoxal and aluminium acetyl acetonate (Alacac) have the most significant effect. Water resistance is at best improved by 85% with the added amounts tested.

EXAMPLE 9

The Impact of Cross-Linking Chemicals on the Water Resistance of Board Coated with a Wax-Containing Dispersion The composition of the wax-containing dispersion was as follows: 8.43 kg of triacetin, 6.25 kg of starch acetate, 2.00 kg of Mowiol 10-74, 18.00 kg of water, 2.5 kg of AKD wax. The cross-linking was performed by admixing the chemicals of Table 3 into the dispersion under intensive stirring.

TABLE 6

| Test | Dispersion g | Glyoxal 40% water solution g | Aluminium acetyl acetonate g | Ammonium-zirconium-carbonate solution g | $Cobb_{60}$ |
|---|---|---|---|---|---|
| 0 | — | | | | 27.5 |
| 1 | 100 | | | | 15.4 |
| 2 | 100 | 12.5 | | | 2.9 |
| 3 | 100 | | 2.0 | | 2.8 |
| 4 | 100 | | | 0.6 | 15.9 |

The cross-linked dispersions were used to coat board by means of rod coating techniques and the same coating conditions for each one. The coating was dried in a heating chamber at 100° C. for 1 h. The water resistance was measured by a Cobb60 test after 24 hours.

The values in Table 6 will show that dispersion coating can be applied to improve the water resistance of board. The use of cross-linking chemicals further increases the water resistance of the coating.

EXAMPLE 10

Improvement of the Barrier Properties of Latex by Means of a Dispersion Addition A starch acetate based dispersion was used to improve the water resistance of synthetic paper coating latex by adding the amounts of dispersion indicated in Table 7 into the commercially available latex Baystal P8522. The samples were stirred for approximately 10 min whereafter board was coated by rod coating techniques, the coating was dried in a heating chamber at 100° C. for 1 h, and, then, water resistance was determined by a Cobb60 test. The results are shown in Table 8.

TABLE 8

| Test | Dispersion g | latex g | Coat weight g/m² | $Cobb_{60}$ |
|---|---|---|---|---|
| 0 | 100 | | 9.0 | 27.5 |
| 1 | 50 | 50 | 4.6 | 4.6 |
| 2 | 70 | 30 | 18.1 | 18.1 |
| 3 | 90 | 10 | 22.3 | 22.3 |
| 4 | | 100 | 24.3 | 19.5 |

EXAMPLE 11

Improvement of the Barrier Properties of Latex by Means of Cross-Linked Dispersions The amounts of a cross-linking chemical indicated in Table 9 were added into a starch acetate based dispersion under intensive stirring. Some Baystal P8522, a commercial latex, was added into these cross-linked dispersions, the mixing ratio being 1:1, and the samples were stirred for approximately 10 min whereafter the stable dispersion obtained was used to rod coat board by rod coating techniques. The coating was subjected to drying at 100° C. in a heating chamber for 1 h, whereafter water resistance was determined by a Cobb60 test. The results are shown in Table 9.

TABLE 9

| Test | Dispersion g | Glyoxal 40% aqueous solution, g | Aluminum-acetyl acetonate g | latex g | Coat weight g/m$^2$ | Cobb$_{60}$ |
| --- | --- | --- | --- | --- | --- | --- |
| 0 | 100 | | | | 9.0 | 27.5 |
| 1 | 100 | 12.5 | | 112.5 | 19.9 | 2.1 |
| 2 | 100 | | 2.0 | 102 | 16.8 | 2.5 |

What is claimed is:

1. A process for the preparation of a dispersion of a hydrophobic polymer, comprising
   a) forming a mixture of a hydrophobic biopolymer, a plasticizer, dispersion auxiliaries and water in the absence of a solvent other than water,
   b) heating up the mixture to 40 to 100° C. in order to obtain a paste-like composition, and
   c) diluting the paste-like composition with water.

2. The process of claim 1, characterized in that steps a and b are carried out simultaneously, whereby the biopolymer, plasticizer, dispersion auxiliaries and water are intermixed at an elevated temperature in order to obtain a paste-like composition.

3. The process of claim 1 or 2, characterized in that during step a, water is added in an amount of 10 to 90%, preferably about 20 to 80%, of the total amount of water in the dispersion.

4. The process of claim 3, characterized in that during step a, an amount of 1 to 200 parts by weight, preferably about 50 to 150 parts by weight of water in relation to 100 parts by weight of polymer is used.

5. The process of claim 1, characterized in that during step a, the dispersion auxiliaries are admixed with the water to be added to the mixture prior to mixing these with the polymer.

6. The process of claim 1, characterized in that during step b, the mixture is heated to about 20 to 100° C., preferably to about 40 to 60° C.

7. The process of claim 1, characterized in that during step a, the mixture is stirred for about 1 mm to 24 h, preferably about 10 mm to 2 h, and during step b, the mixture is stirred for 1 mm to 24 h, preferably about 10 mm to 2 h.

8. The process of claim 7, characterized in that the total stirring time of steps a and b is approximately 5 min to 4 h.

9. The process of claim 1, characterized in that in step c, water is added to the paste at an elevated temperature.

10. The process of claim 9, characterized in that the water is added to the as yet uncooled paste after step b whilst allowing the paste to cool.

11. The process of claim 1, characterized in that a cross-linking chemical is added to the dispersion in order to improve the water resistance of the dispersion.

12. The process of claim 11, characterized in that as cross-linking chemicals, glycosal, aluminium salts or zirconium salts are used.

13. The process of claim 1, characterized in that as biopolymer, a starch ester from native starch, hydrolyzed starch, oxidized starch, cross-linked starch or gelatinized starch, a starch ether, a mixed ester/ether of starch and/or grafted starch or a similar starch component is used.

14. The process of claim 13, characterized in that as starch component, a starch acetate is used with a degree of substitution of 0.5 to 3, advantageously 1.5 to 3 and preferably 2 to 3.

15. The composition of claim 13, characterized in that as starch component, hydroxy alkylated starch or an ester thereof is used.

16. The process of claim 13, characterized in that as starch component, a hydroxy propyl starch is used whose molar degree of substitution is 1.4 at the most, advantageously 1 at the most, or a hydroxy propyl starch ester whose molar degree of substitution is 1.4 at the most, advantageously 1 at the most, and particularly preferably 0.1 to 0.8, and the degree of substitution is at least 2, advantageously 2.5 to 3.

17. The process of claim 1, characterized in that as biopolymer, polycaprolactone, lactic acid polymer, lactic acid-based polyester urethane, polylactide, cellulose acetate and/or polyhydroxy butyrate/valerate is used.

18. The process of claim 17, characterized in that as polymer, a mixture of polycaprolactone, lactic acid polymer, lactic acid-based polyester urethane, polylactide, cellulose acetate and/or polyhydroxy butyrate/valerate and a starch component is used.

19. The process of claim 13, characterized in that as plasticizer, triacetin, diacetin, monoacetin, triethyl citrate, tributyl citrate, acetyl triethyl citrate, acetyl tributyl citrate, dimethyl succinate, diethyl succinate, oligoesters of amber acid and diols, ethyl lactate, methyl lactate, a fatty acid ester of glycerol, castor oil, olive oil, rapeseed oil, tall oil, dibutyl phthalate, diethyl phthalate, or a mixture thereof is used.

20. The process of claim 1, characterized in that a surface-active agent is used as dispersion auxiliary.

21. The process of claim 20, characterized in that as the surface-active agent, a cationic, anionic or non-ionic tenside, such as a polyoxyethylene derivative, saponin, alkyl sulphonate, alkyl benzene sulphonate, fatty acid soap, lignosulphonate, sarcosinate, fatty acid amine and amide, phospholipid, sugar lipide, lecithin and/or wood extract is used.

22. The process of claim 1, characterized in that as auxiliary, polyvinyl alcohol, cationic starch, hydroxy alkyl starch and/or hydroxy alkyl cellulose is used.

23. The process of claim 22, characterized in that the weight-average molar mass of the polyvinyl alcohol is about 10,000 to 115,000.

24. The process of claim 1, characterized in that as the dispersion auxiliary, alkyl-ketene dimer (AKD) wax, beeswax or carnauba is used.

25. The process of claim 1, characterized in that the dispersion further contains tall resin or derivatives thereof.

26. The process of claim 1, characterized in that the dispersion further contains alkyd compounds.

27. The process of claim 1, characterized in that
   100 parts by weight of a starch ester, 5 to 50 parts by weight of a protective colloid and 10 to 200 parts by weight of a plasticizer are admixed with 70 to 120 parts by weight of water containing 0.1 to 10 parts by weight of a surface-active agent in order to provide a starch ester blend,
   after initial stirring, the temperature of the blend is raised to 40 to 90° C. and the stirring is continued until a white paste-like composition is obtained, and
   50 to 150 parts by weight of water are added to said composition whilst allowing the temperature of the composition to decline to room temperature.

28. A method of coating a paper or a board which comprises contacting the polymer dispersion prepared according to claim 1 with said paper or board.

29. A method of manufacturing water-based adhesives which comprises adding an effective amount of the polymer dispersion prepared according to claim 1 to an adhesive composition.

30. A method of manufacturing paint which comprises adding an effective amount of the polymer dispersion prepared according to claim 1 to a paint composition.

31. A method of lacquer coating for wood or other materials which comprises contacting the polymer dispersion prepared according to claim 1 with said wood or other materials.

32. A method of manufacturing cast films which comprises adding an effective amount of the polymer dispersion prepared according to claim 1 to a cast film composition.

33. A method of manufacturing materials containing cellulosic fibres which comprises adding an effective amount of the polymer dispersion prepared according to claim 1 to cellulosic fibres materials.

34. The process of claim 1, wherein the dispersion is prepared with no solvents other than water.

* * * * *